US005472602A

United States Patent [19]

Feller et al.

[11] Patent Number: 5,472,602

[45] Date of Patent: Dec. 5, 1995

[54] EVERTABLE DRUM CENTRIFUGE FILTER

[75] Inventors: Johann Feller, Tuntenhausen; Erich Dommer, Ottensoos; Michael Liebl, München; Johann Messner, Pasenbach, all of Germany

[73] Assignee: Krauss Maffei Aktiengesellschaft, Munich, Germany

[21] Appl. No.: 334,850

[22] Filed: Nov. 4, 1994

[30] Foreign Application Priority Data

Nov. 4, 1993 [DE] Germany .......................... 43 37 618.5

[51] Int. Cl.[6] .......................... B01D 33/067; B04B 7/18; B04B 11/00

[52] U.S. Cl. .......................... 210/370; 210/380.3; 494/36; 494/38; 494/83

[58] Field of Search .......................... 494/1, 5, 7, 36, 494/38, 41, 42, 45, 47, 48, 50, 60, 83; 210/232, 369, 372, 370, 380.1, 380.3

[56] References Cited

U.S. PATENT DOCUMENTS

| | | | |
|---|---|---|---|
| 4,193,874 | 3/1980 | Gerteis | 210/370 X |
| 4,269,711 | 5/1981 | Gerteis | 210/370 X |
| 4,944,874 | 7/1990 | Kobayashi et al. | 210/370 X |
| 5,092,995 | 3/1992 | Gerteis | 210/232 |

FOREIGN PATENT DOCUMENTS

| | | | |
|---|---|---|---|
| 3106022 | 9/1982 | Germany | 494/36 |
| 3430507 | 2/1986 | Germany . | |
| 3520134 | 12/1986 | Germany | 494/36 |
| 3740411 | 6/1989 | Germany . | |
| 3916266 | 8/1990 | Germany . | |
| 92/04982 | 4/1992 | WIPO . | |

*Primary Examiner*—Charles E. Cooley
*Attorney, Agent, or Firm*—Herbert Dubno; Andrew Wilford

[57] ABSTRACT

An evertable drum centrifuge has a drum with a generally cylindrical and perforate outer wall and having an axially forwardly open front end. An end wall of the drum can move axially between a closed position fitting in the front outer-wall end and an open position spaced axially forward of the outer wall and is centrally formed with a fill opening. An annular liner of a flexible foraminous filter medium has a front edge attached to the outer-wall end and a back edge attached to a rim of extension structure fixed on the end wall. When the end wall move between the closed and open positions, the liner moves from a normal position inside the drum and extending backward from the front end to the rim to an everted position substantially outside the drum and extending forward in the solids compartment from the front end to the rim. An axially displaceable fill tube carries an axially nondisplaceable fill head complementarily engageable in the fill opening and having an annular seal engageable with the fill tube. A bearing supports the fill head on the fill tube for rotation thereon about the axis so that, when the end wall moves axially with the fill head engaged in the fill opening, the fill tube moves axially jointly with the end wall. A suspension is supplied through the fill tube in the closed position of the end wall and normal position of the fill tube to the interior of the drum.

14 Claims, 2 Drawing Sheets

EVERTABLE DRUM CENTRIFUGE FILTER

FIELD OF THE INVENTION

The present invention relates to a centrifuge filter. More particularly this invention concerns an evertable drum centrifuge filter.

BACKGROUND OF THE INVENTION

An evertable drum centrifuge has a housing extending along an axis and defining a back filtrate compartment and a front solids compartment spaced therefrom and a filter drum rotatable in the housing about the axis. This drum has a generally cylindrical and perforate outer wall centered on the axis, axially fixed in the filtrate compartment, and having an axially forwardly open front end. An end wall of the drum extends transverse to the axis and is displaceable axially between a closed position fitting in and closing the front outer-wall end and an open position spaced axially forward of the outer wall and lying in the solids compartment. This end wall is formed at the axis with a central fill opening. Extension structure fixed on the end wall has an annular rim spaced axially backward from the end wall and an annular liner of a flexible foraminous filter medium has a front edge attached to the outer-wall end and a back edge attached to the extension-structure rim. The end wall and extension can be displaced between the closed and open positions to displace the liner from a normal position inside the drum and extending backward from the front end to the rim to an everted position substantially outside the drum and extending forward in the solids compartment from the front end to the rim. A fill tube extending along the axis and having a back end provided with a fill head engageable in the fill opening can feed a suspension to an interior of the drum.

Thus in the normal position of the drum solids will be trapped as a filter cake on the liner and the liquid of the suspension will pass through the the liner and through perforate drum wall to the filtrate compartment. To clear the filter cake the end wall and structure are moved into the front position so that the liner is everted, that is turned inside out, in the solids compartment. The cake on the liner falls off, if necessary helped by rotation of the drum and liner. Such a system can therefore be used for batch filtering.

In German patent document 3,740,411 of H. Gerteis the fill tube is axially fixed in the housing and the fill hole of the end wall is provided with a liner sleeve supported on a bearing for rotation about the axis and also provided with flexible seals engageable with the head of the fill tube. The fill-tube head in turn is enlarged and has axially oppositely tapering ends. Thus as the end wall is moved to the open position it slips over the head. This system is an improvement on the system of earlier German patent 3,430,507 of H. Gerteis where the fill tube is also stationary but fits with play through the fill hole.

The problem with this system is that there is invariably some leakage between the head and the end wall. The filtrate is splashed back by the structure. Thus some of the filtrate gets into the solids compartment. As a result the stripped-off filter cake is moistened and contaminated. Furthermore in a system where the interior of the drum is pressurized to assist the filtration, leakage at the joint either makes such pressurization very difficult or altogether impossible.

In German patent 3,916,266 of H. Gerteis the fill hole is provided with a fluid-pressurizable gland/seal. Such a system works wholly batch wise, that is the seal is opened and the fill tube is pushed through the fill opening into the drum, a quantity of suspension to be filtered is injected into the drum, and then the fill tube is retracted and the opening closed by the gland so that the drum can be rotated and the suspension filtered.

This system largely eliminates any possibility of leakage, but is slow and cumbersome to use. The retraction and advance of the fill tube is an extra step that unnecessarily slows production, and each batch can only be as much as will fill the drum to slightly less than half full, so a succession of small batches must be processed before the filter cake is turned out.

In PCT publication WO 92/04,982 also of H. Gerteis the fill tube can rotate and passes through a fairly tight pressurizable gland carried on the fill tube into the drum. During filling and operation thereafter the joint between the fill tube and the drum end wall can therefore be sealed very tightly. Such a system is, however, fairly complex with respect to feeding the suspension to the drum and pressurizing the gland. In addition a separate drive must normally be provided for the fill tube as otherwise the gland is subjected to damaging torque.

OBJECTS OF THE INVENTION

It is therefore an object of the present invention to provide an improved everting drum centrifuge.

Another object is the provision of such an improved everting drum centrifuge which overcomes the above-given disadvantages, that is which is of relatively simple construction but which ensures an excellent and very tight seal between the fill head and the fill hole of the drum end wall.

SUMMARY OF THE INVENTION

An evertable drum centrifuge has according to the invention a housing extending along an axis and defining a back filtrate compartment and a front solids compartment spaced therefrom and a filter drum rotatable in the housing about the axis. The drum has a generally cylindrical and perforate outer wall centered on the axis, axially fixed in the filtrate compartment, and having an axially forwardly open front end. It also has an end wall extending transverse to the axis and displaceable axially between a closed position fitting in the front outer-wall end to form a closed interior therewith and an open position spaced axially forward of the outer wall and lying in the solids compartment. The end wall is formed at the axis with a central fill opening. Extension structure fixed on the end wall has an annular rim spaced axially backward from the end wall. An annular liner of a flexible foraminous filter medium has a front edge attached to the outer-wall end and a back edge attached to the extension-structure rim. An actuator can axially displace the end wall and extension structure between the closed and open positions and thereby displace the liner from a normal position inside the drum and extending backward from the front end to the rim to an everted position substantially outside the drum and extending forward in the solids compartment from the front end to the rim. A fill tube extending along the axis has a back end and carries an axially nondisplaceable fill head complementarily engageable in the fill opening and having an annular seal engageable with the fill tube. A bearing supports the fill head on the fill tube for rotation thereon about the axis and a guide supports the fill tube on the housing for movement axially thereof so that, when the end wall moves axially with the fill head engaged in the fill opening, the fill tube moves axially jointly with the end wall. A suspension is supplied through the fill tube and fill opening in the closed position of the end wall and normal position of the fill tube to the interior of the drum.

Thus with this system the fill head fits like a plug in the fill opening of the end wall and is mounted by its own bearing on the fill tube. The fact that the fill tube can move axially means that the fill head will remain solidly in place regardless of the position of the end wall. Any radial throw caused by an off center load will not impair the seal between the fill head and the fill tube. Since the fill head does not rotate relative to the drum end wall, it can be made to fit very tightly to completely eliminate leakage at this site. This is achieved when the opening has a forwardly frustoconically flared outer surface and the head has a complementary rearwardly frustoconically tapered outer surface. The seal between the fill head and the end wall is only statically loaded since there is no relative movement, so it can be counted on to seal efficiently. Similarly the seal between the fill head and the fill tube does not have to compensate for relative axial movement, so it also will seal well. Even in a system where the drum interior is pressurized to enhance the throughput, there will be no leakage at the fill head. No separate drive for the rotatable fill head is necessary, as same is entrained rotationally by the end wall.

According to a feature of the invention at least one seal ring set in one of the surfaces engages the other surface. Normally the seal ring is an O-ring set in the plug surface. In fact it is possible to use a pair of axially spaced seal rings set in one of the surfaces and engaging the other surface. These seal rings are O-rings set in the surface of the head.

The bearing according to the invention is an axial-thrust roller bearing having an inner race on the fill tube and an outer race on the head. It is a ball bearing.

In accordance with further features of the invention the seal is a self-sealing lip-type seal or gland between the fill tube and the fill head and rearward of the bearing. Another lip-type seal can be provided between the fill tube and the fill head and forward of the bearing. The bearing is flanked by the lip-type seals. Such seals are actuated by the pressure they are working on, so as pressure increases sealing effectiveness also increases.

Normally according to the invention a second actuator independent of the first-mentioned actuator urges the fill tube and head backward into engagement with the end wall. The actuators are fluid-powered cylinders. A controller pressurizes the actuators such that the head is urged backward with less force than the force with which the end wall is urged forward to move the liner into the everted position. When both actuators are double-acting, it is possible to gang them for joint operation in a very simple manner.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
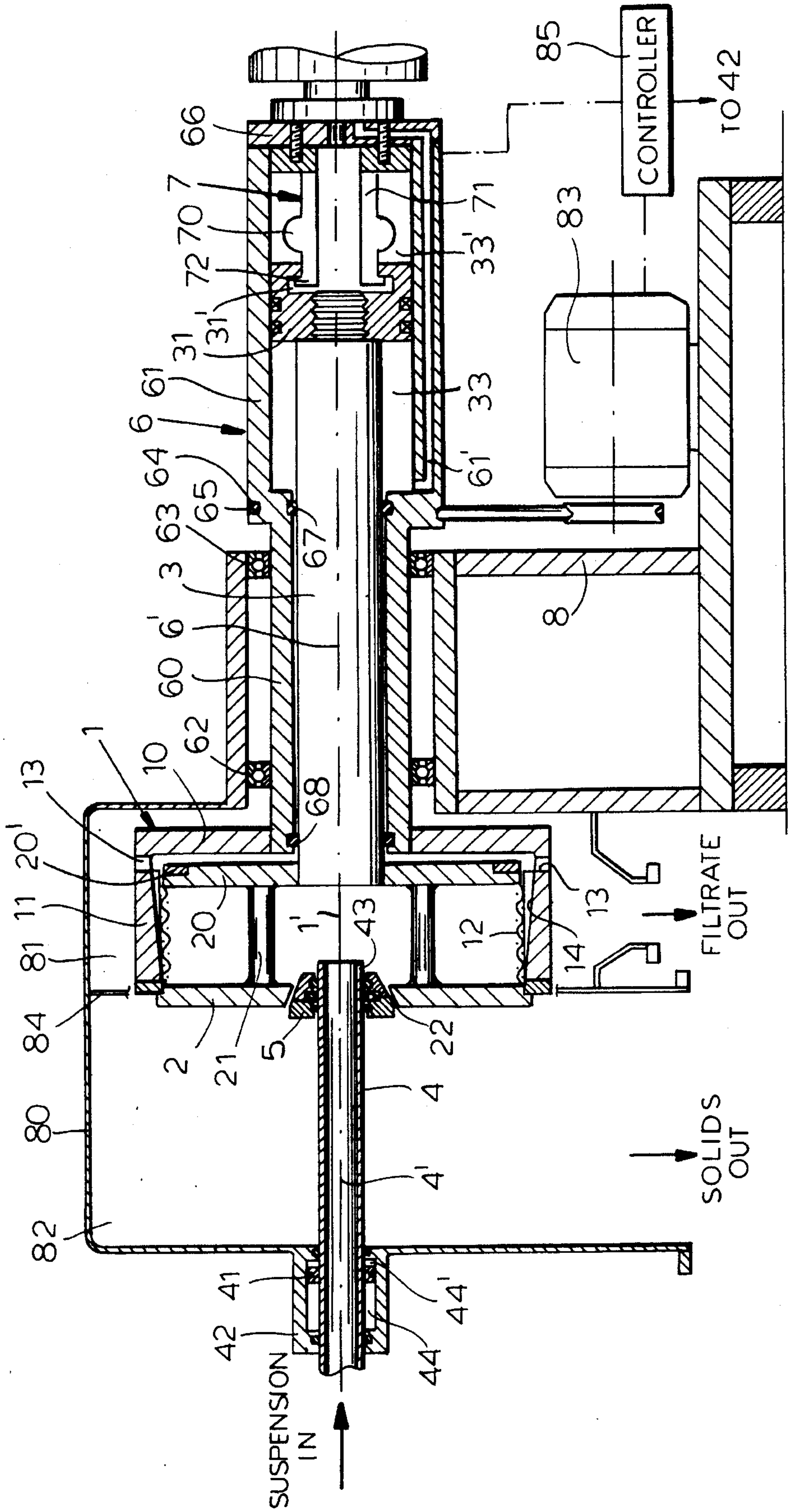
FIG. 1 is a small-scale vertical section through a filter machine according to the invention.

As seen in FIG. 1 an evertable centrifuge filter has a housing 8 in which is rotatable a drum 1 carried on a tube shaft 6 and having an axially displaceable circular end wall or plate 2 carried on a shaft 3 coaxially received in the shaft 6. A fill tube 4 has a head 5 for supplying a suspension to be filtered to the interior of the drum 1. The shaft 3 can move axially in the outer tube shaft 6 which is provided with a governor-type latch 7. The housing 8 has a front end 80 subdivided by a partition 84 level with the front edge of the drum 1 into a rear filtrate compartment 81 and a front solids compartment 82.

The drum 1 has a planar back end wall 10 extending perpendicular to a drum axis 1' and a cylindrical side wall 11 with a forwardly (toward the left in FIG. 1) tapered inner surface 14 and radially through going perforations 13 at its rear edge. A mesh or cloth filter-medium liner 12 of basically cylindrically tubular shape has one end secured to the front edge of the side wall 11 and an opposite end secured to an outer edge or rim 20' of a circular support plate 20 spaced by struts 21 backward from the end plate 2, which itself can fit tightly as shown in the front end of the side wall 11 to close the drum. The end wall or plate 2 is formed centrally on an axis 1' of the drum 1 with a fill hole 22.

The shafts 3 and 6 are coaxial about an axis 6' coaxial with the axis 1' and are rotationally coupled together, for instance by a key or splines. The outer shaft 6 has a small-diameter front portion 60 supported by roller bearings 62 and 63 in the housing 8 and supporting the shaft 3 by seals 67 and 68 and a larger-diameter back portion 61 subdivided by a piston 31 on the shaft 3 into a front compartment 33 and a rear compartment 33'. The latch 7 includes a plurality of radially spreadable arms 71 formed with weights 70 and having outer ends 72 engageable in a radially inwardly open groove 31' formed in the rear end of the piston 31. These arms 71 are carried on a plate 66 sealing the rear end of the tubular shaft 6 and when spread as illustrated by centrifugal force prevent the piston 31 and end wall 2 from moving axially forward. Passages such as 61' formed in the shaft 6 allow the compartments 33 and 33' to be pressurized in a manner well known in the art. The rear part 61 of the shaft 6 is formed with a groove 64 in which rides a belt 65 connected to a drive motor 83 for rotating the drum 1.

Figure 2:
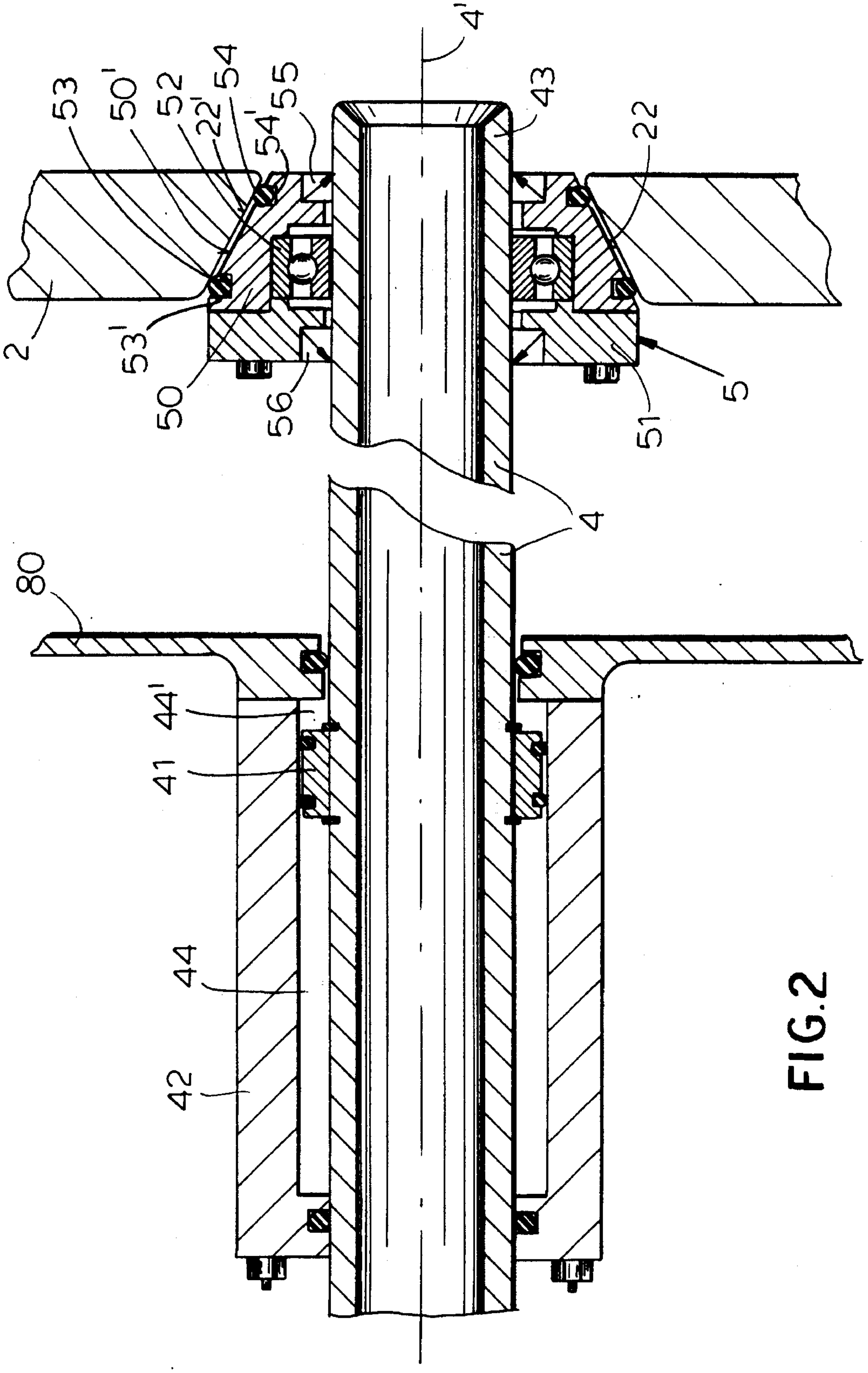
FIG. 2 is a large-scale view of details of FIG. 1.

As seen also in FIG. 2, the shaft 4 is centered on an axis 4' coaxial with the axes 1' and 6' and is axially slidable in a cylinder-forming guide 42 of the housing 8. This tube 4 carries a piston 41 subdividing the cylinder/guide 42 into a front compartment 44 and a back compartment 44'. At its opposite rear end the tube 4 has a roller bearing 52 supporting a front part 50 of the head 5 whose back part 51 is bolted on to capture the bearing 52. Gland-type seals 55 and 56 axially flank the bearing 52 and prevent leakage between a front end 43 of the tube 4 and the head 5. The head 5 has a frustoconical and rearwardly tapered outer surface 50' centered on the axis 4' and complementary to a forwardly flared and frustoconical inner surface 22' of the fill opening 22. O-ring seals 53 and 54 set in grooves 53' and 54' in the surface 50' engage the surface 22'.

FIG. 1 shows the normal use position of the apparatus. The motor 83 rotates the entire drum 1 at high speed about the axis 1', 4', 6' while a suspension is fed to the front end of the tube 4. This suspension exits from the rear end of the tube 4 into the interior of the drum 1 where it moves radially outward. The liquid of the suspension passes through the filter-medium lining 12 and the holes 13 to exit the machine via the compartment 81. Meanwhile a cake of solids will build up on the inner surface of the filter lining. During this process it is of course possible to pressurize the interior of the drum 1 to increase the pressure differential across the filter medium 12.

When the filter cake has built up to the desired thickness, the infeed of suspension is stopped to dry it out. Once it is dry the drive 83 is stopped to release the latch 7. The compartment 33' is then pressurized by a controller 85 to push the shaft 3 forward. Meanwhile the compartment 44 is pressurized by the controller 85 sufficiently to hold the head 5 in the hole 22, but not enough to impede forward movement of the plate 2.

As the plate 2 moves forward the filter lining 12 is everted, that is turned inside out. The filter cake on its inner surface will naturally fall off as it is everted, dropping down in the solids compartment 82.

Once the filter cake has all fallen off the everted lining 12, the pressurization of the compartment 33' is cut and, if necessary the compartment 33 as well as the compartment 44 are pressurized by the controller 85 to move the parts back into the normal use position of FIG. 1.

We claim:

1. An evertable drum centrifuge comprising:

a housing extending along an axis and defining a back filtrate compartment and a front solids compartment spaced from the back filtrate compartment;

a filter drum rotatable in the housing about the axis and having a generally cylindrical and perforate outer wall centered on the axis, axially fixed in the filtrate compartment, and having an axially forwardly open front end, an end wall extending transverse to the axis and displaceable axially between a closed position fitting in the outer-wall front end to form a closed interior therewith and an open position spaced axially forward of the outer wall and lying in the solids compartment, the end wall being formed at the axis with a central fill opening, extension structure fixed on the end wall and having an annular rim spaced axially backward from the end wall, and an annular liner of a flexible foraminous filter medium having a front edge attached to the outer-wall front end and a back edge attached to the extension-structure rim;

actuating means for axially displacing the end wall and extension structure between the closed and open positions and thereby displacing the liner from a normal position inside the drum and extending backward from the outer-wall front end to the rim to an everted position substantially outside the drum and extending forward in the solids compartment from the outer-wall front end to the rim;

a fill tube extending along the axis and having a back end;

a fill head axially nondisplaceable on the fill-tube back end, complementarily engageable in the fill opening, and having an annular seal engageable with the fill tube;

bearing means supporting the fill head on the fill tube for rotation thereon about the axis;

guide means supporting the fill tube on the housing for movement axially thereof so that, when the end wall moves axially with the fill head engaged in the fill opening, the fill tube moves axially jointly with the end wall; and means for supplying a suspension through the fill tube and fill opening in the closed position of the end wall and normal position of the fill tube to the interior of the drum.

2. The evertable drum centrifuge defined in claim 1 wherein the opening has a forwardly frustoconically flared inner surface and the head has a complementary rearwardly frustoconically tapered outer surface.

3. The evertable drum centrifuge defined in claim 2, further comprising a seal ring set in one of the surfaces and engaging the other of the surfaces.

4. The evertable drum centrifuge defined in claim 3 wherein the seal ring is an O-ring.

5. The evertable drum centrifuge defined claim 2, further comprising a pair of axially spaced seal rings set in one of the surfaces and engaging the other of the surfaces.

6. The evertable drum centrifuge defined in claim 5 wherein the seal rings are O-rings set in the surface of the head.

7. The evertable drum centrifuge defined in claim 1 wherein the bearing means is an axial-thrust roller bearing having an inner race on the fill tube and an outer race on the head.

8. The evertable drum centrifuge defined in claim 7 wherein the bearing is a ball bearing.

9. The evertable drum centrifuge defined in claim 1 wherein the seal between the fill tube and the fill head is a lip-type seal rearward of the bearing means.

10. The evertable drum centrifuge defined in claim 9, further comprising at least one other lip-type seal between the fill tube and the fill head and forward of the bearing means.

11. The evertable drum centrifuge defined in claim 10 wherein the bearing means is a bearing flanked by the lip-type seals.

12. The evertable drum centrifuge defined in claim 1, further comprising second actuating means independent of the first-mentioned actuating means for urging the fill tube and head backward into engagement with the end wall.

13. The evertable drum centrifuge defined in claim 12 wherein the actuating means are fluid-powered cylinders.

14. The evertable drum centrifuge defined in claim 13, further comprising control means for pressurizing the actuating means such that the head is urged backward with less force than the force with which the end wall is urged forward to move the liner into the everted position.

* * * * *